W. S. BATE.
Compound Faucets.

No. 141,102.  Patented July 22, 1873.

Witnesses: Hubert Howson, Harry Smith

Wm. S. Bate
by his attys.
Howson and Son

UNITED STATES PATENT OFFICE.

WILLIAM S. BATE, OF PHILADELPHIA, PENNSYLVANIA.

IMPROVEMENT IN COMPOUND FAUCETS.

Specification forming part of Letters Patent No. 141,102, dated July 22, 1873; application filed June 18, 1873.

*To all whom it may concern:*

Figure 1:
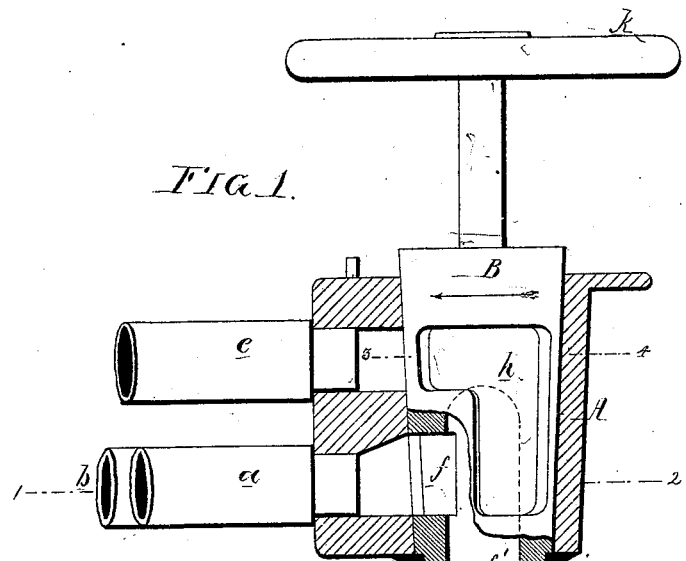

Be it known that I, WILLIAM S. BATE, of the city and county of Philadelphia, State of Pennsylvania, have invented an Improved Compound Faucet, of which the following is a specification:

The object of my invention is a compound faucet, whereby two different liquids, or a mixture of both, may be directed into either of two distinct discharge pipes or nozzles; and I attain this object in the manner plainly shown in the sectional elevation, Figure 1 of the accompanying drawing, by combining a casing, A, having two supply-pipes, $a$ and $b$, and two discharge pipes or nozzles, $d$ and $e$, with a valve, B, having a port, $f$, for establishing communication between either or both of the supply-pipes and the nozzle $d$, and a surface port, $h$, for establishing communication between either or both of the said supply-pipes and the discharge-pipe $e$.

The compound faucet shown in the drawing is adapted especially for bath-room use, and is intended to take the place of the several faucets commonly requisite to regulate the supply of hot and cold water for the tub and shower-bath.

The valve B is a simple conical plug adapted to a vertical opening of corresponding shape in the casing A, in which it is retained by the nozzle $d$, the latter screwing onto the end of the valve in the manner of a nut, and a suitable packing, $i$, intervening between the same and the casing to prevent leakage. The valve may, however, be retained in position by an ordinary nut, and the nozzle form a permanent part of the casing.

Figure 2:
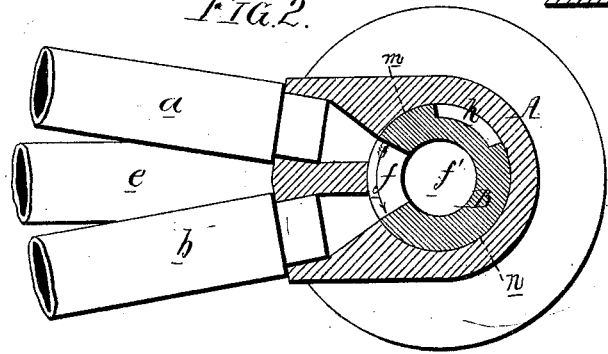

The cold and hot water supply-pipes $a$ and $b$ are arranged closely together, and are, in the present instance, on the same horizontal line, as best observed in the inverted sectional plan view, Fig. 2, taken on the line 1 2, Fig. 1. They are also directly opposite the port $f$ of the valve, which communicates with the central opening $f^1$ in the same and the nozzle $d$, and opposite the L-shaped surface-port $h$ on the said valve, by which communication is established with the discharge-pipe $e$ leading to the shower-bath.

Figure 3:
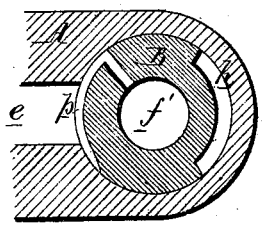

The operation of the faucet is as follows: By turning the valve B by means of its handle $k$ in the direction of the arrow, the port $f$ is first brought opposite the pipe $a$, the cold water from which will pass through the said port and nozzle $d$ into the bath-tub. By continuing to turn the valve in the same direction the port $f$ will be brought opposite both pipes $a$ and $b$, as shown in Fig. 2, when a mixture of hot and cold water, which may be tempered as desired by a simple movement of the valve, will be caused to flow through the nozzle into the tub. A further movement of the valve will cut off the cold water and permit hot water only from the pipe $b$ to flow from the nozzle $d$. The portion $m$ of the valve will cut off the whole supply of both hot and cold water when brought opposite the pipes $a$ and $b$, but when this has been passed by a continued movement of the valve in the same direction as before, the surface-port $h$ will first be brought opposite the cold-water pipe $a$, then opposite both pipes $a$ and $b$, and finally opposite the pipe $b$ only, a supply of cold water, or of mixed cold and hot water, or hot water alone being thus directed to the shower-bath pipe $e$, as desired. The faucet is closed and the supply cut off from both the nozzle $d$ and shower-bath pipe $e$ when the portion $n$ of the valve is opposite the pipes $a$ and $b$, and when the parts are in this position a groove, $p$, in the valve (see sectional plan, Fig. 3, on the line 3 4, Fig. 1,) is brought opposite the shower-bath pipe, and conveys the waste from the same into the central opening $f'$ of the valve, whence it is discharged through the nozzle $d$.

Figure 4:
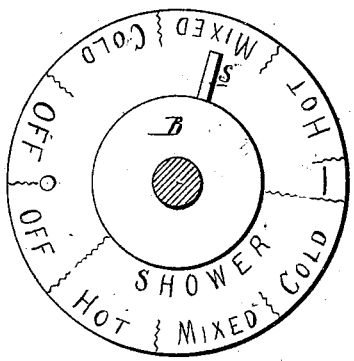

As it would be very difficult by an examination of the exterior of the faucet to determine the position of the valve-ports in respect to the supply and discharge pipes, I propose to combine an indicator with the faucet, as shown in the plan view Fig. 4 of the drawing. It consists simply of a pin, $s$, on the valve or valve-stem, which, when brought opposite radial marks on the top of the casing, will indicate at a glance the position of the ports, thus enabling the valve to be turned at once and without experimenting to the desired position.

The compound faucet may be used for various purposes as well as in bath-rooms, and in some cases where but one discharge pipe or nozzle is required, the port $f$ and nozzle $d$ may be dispensed with, and the supply-pipes be combined with the surface-port $h$ and pipe $e$ only.

I claim as my invention—

1. A compound faucet in which a casing having two supply-pipes, $a$ and $b$, and two discharge pipes or nozzles is combined with a valve, B, having ports so arranged as to establish communication between either of the supply-pipes independently or both simultaneously, and either of the discharge-pipes, all substantially as specified.

2. A compound faucet in which a casing, A, having two supply-pipes, $a$ and $b$, and a discharge pipe or nozzles, $e$ and $d$, is combined with a valve, B, having a surface-port, $h$, for establishing communication between either or both of the supply-pipes and the said discharge-pipe, all substantially as specified.

3. The combination, with the discharge-pipe $e$, of the channel and passage $p$ in the valve, for the purpose specified.

In testimony whereof I have signed my name to this specification in the presence of two subscribing witnesses.

WILLIAM S. BATE.

Witnesses:
WM. A. STEEL,
HUBERT HOWSON.